United States Patent
Kuo et al.

(10) Patent No.: US 6,966,007 B2
(45) Date of Patent: Nov. 15, 2005

(54) PERFORMANCE CONTROL METHOD FOR A COMPUTER

(75) Inventors: Chih-Hung Kuo, Taipei Hsien (TW); Ping-Tsun Yang, Pingtung Hsien (TW)

(73) Assignee: Quanta Computer, Inc., Taoyuan Hsien (TW)

( * ) Notice: Subject to any disclaimer, the term of this patent is extended or adjusted under 35 U.S.C. 154(b) by 482 days.

(21) Appl. No.: 10/279,941

(22) Filed: Oct. 24, 2002

(65) Prior Publication Data

US 2004/0006719 A1    Jan. 8, 2004

(30) Foreign Application Priority Data

Jul. 8, 2002 (TW) .............................. 91115104 A

(51) Int. Cl.[7] .............................................. G06F 1/32
(52) U.S. Cl. ..................................... 713/320; 713/300
(58) Field of Search ................................ 713/300, 320

(56) References Cited

U.S. PATENT DOCUMENTS

2001/0044909 A1   11/2001   Oh et al. .................... 713/600

OTHER PUBLICATIONS

Compaq Computer Corporation, Intel Corporation, Microsoft Corporation, Phoenix Technologies Ltd., Toshiba Corporation, Advanced Configuration and Power Interface Specification, Jul. 27, 2000, Revision 2.0, pp. 220-224.*

* cited by examiner

*Primary Examiner*—Lynne H. Browne
*Assistant Examiner*—Anand B. Patel
(74) *Attorney, Agent, or Firm*—Thomas, Kayden, Horstemeyer & Risley

(57) ABSTRACT

This present invention describes a performance control method for a computer. An advanced configuration and power interface (ACPI) is used to control the performance of desktop CPU. According to this method, the control items in the ACPI are set according to the throttling function setting and according to the requirement of the user to set the number of the related performance states supported by the CPU. Then, the operation system selects the related performance state of the CPU according to the required system power.

17 Claims, 2 Drawing Sheets

|  | Without Performance setting | | With Performance setting | |
|---|---|---|---|---|
| Life test | With Wieless LAN | 3:31 (hour : minutes) | With Wieless LAN | 3:43 (hour : minutes) |
|  | Without Wieless LAN | 3:56 (hour : minutes) | Without Wieless LAN | 3:57 (hour : minutes) |
| Conditioning test | With Wieless LAN | 2:03 (hour : minutes) | With Wieless LAN | 2:39 (hour : minutes) |
|  | Without Wieless LAN | 2:13 (hour : minutes) | Without Wieless LAN | 2:43 (hour : minutes) |

FIG. 3

PERFORMANCE CONTROL METHOD FOR A COMPUTER

FIELD OF THE INVENTION

The present invention relates to a performance control method for a computer, and more particularly to a method for improving the performance control of a desktop CPU.

BACKGROUND OF THE INVENTION

When environmental protection is emphasized, the computer industry is required to produce computers that have a reduced environmental impact, such as a green computer. The most standard of green computers is a computer that has reduced power consumption.

Methods that may be used to control the central processing unit (CPU) are described as follows. The first method is the SpeedStep technology developed for controlling mobile CPUs by Intel. The basic principle of this method is that a mobile CPU runs at a speed virtually identical to that of a desktop CPU when the notebook computer is connected to an AC outlet. When powered by a battery, the processor drops to a lower frequency and voltage, conserving battery life while maintaining a high level of performance. In other words, the mobile CPU runs at different speeds as appropriate for different power sources. For example, a mobile CPU of 1.8 GHz frequency is powered by a 1.3V operation voltage and runs at 1.8 GHz when the notebook computer is connected to an AC outlet. In contrast, this mobile CPU is powered by a 1.2V operation voltage and runs at 1.2 GHz to reduce power consumption when the notebook computer is powered by a battery. In other words, the SpeedStep technology automatically reduces the operation speed of the mobile CPU to extend battery life when a battery is used as the power source. However, the SpeedStep technology developed by Intel does not support desktop CPUs.

Another method that may be used by both a mobile CPU and a desktop CPU is a throttling technology. This technology performs a throttling function inside the CPU. FIG. 1 shows an example of the CPU performing the throttling function. In a duty cycle, the operation system can generate a policy to run the processor at a predetermined ratio such that the performance is less than the maximum performance. This policy may run the CPU in accordance with the state of the operation system. As shown in FIG. 1, the throttling function mechanism provides the operation system with the functionality to run the CPU at a special percentage of a duty cycle. In other words, the temperature of the CPU will increase if the CPU keeps running at full speed. At this time, the operation system automatically slows down the CPU to reduce the temperature of the CPU. For example, the operation system generates a policy to automatically adjust the CPU to run at a special percentage, such as 50%, of a duty cycle if the temperature reaches the highest limit. The operation system adjusts the CPU again until the temperature of the CPU is acceptable to keep running for the whole duty cycle. This throttling function ensures that the computer system performs well. However, the main goal of this method is the thermal control of the CPU. Dynamically changing the performance in accordance with the requirements of the computer system is therefore difficult with this method.

Use of a desktop CPU in a notebook computer is an effective method of reducing the cost and increasing the performance. Such application of desktop CPUs in notebook computer is however hindered by the high heat generation and power consumption of the desktop CPU. The SpeedStep technology described above and developed by Intel can be directly controlled by Win XP developed by Microsoft. This SpeedStep technology permits the operation system to adjust the operation speed of the CPU to reduce the power consumption in accordance with its condition. However, desktop CPUs developed by Intel do not support this function.

A way of reducing the cost of notebook computers and the power consumption of desktop CPU is therefore required. Such a reduction is further constrained in that it must preserve the existing hardware framework while resolving the above problems.

SUMMARY OF THE INVENTION

According to the above descriptions of the prior art, the SpeedStep technology developed by Intel may be directly controlled by the operation system. This operation system may use the SpeedStep technology to adjust the operation frequency and voltage of the CPU in accordance with its job condition to reduce power consumption. However, the desktop CPU developed by Intel does not support SpeedStep function. On the other hand, the conventional throttling function technology permits the operation system to slow down automatically the CPU when the temperature of the CPU exceeds a specified temperature while running. In other words, the main goal of the throttling function is thermal control, not dynamically changing the performance in accordance with the requirements of the system. Therefore, this present invention provides a method for the desktop CPU not supported by SpeedStep to change dynamically the performance in accordance with the requirements of the system.

The main purpose of the present invention is to provide a performance control method under the Advanced Configuration and Power Interface (ACPI).

Another purpose of the present invention is to provide a method for controlling the performance of the desktop CPU in accordance with the Advanced Configuration and Power Interface under the Win XP operation system.

In accordance with the method of the present invention, three control instructions, _PCT, _PSS and _PPC, are provided by the ACPI. The three control instructions may be used to control the performance of the CPU. The _PCT and the _PSS control instructions are used to control the mobile CPU that supports the SpeedStep technology. _PPC is used to set the number of the related performance speed supported by the CPU. The related performance speed is the work percentage in a duty cycle of the CPU. Typically, the three control instructions do not start when using a desktop CPU that does not support SpeedStep. However, the present invention starts the three control instructions when using the desktop CPU. At the same time, the setting of the _PCT and the _PSS control instructions is changed. This change makes the operation system think that the CPU supports the SpeedStep. Such changes achieve the goal of controlling CPU performance.

The desktop CPU and the mobile CPU both support the throttling function technology. The main purpose of this technology is to permit the operation system to slow down automatically the CPU when the temperature of the CPU exceeds a specified temperature. Therefore, the set of the _PCT and the _PSS control instructions provided by the ACPI in the present invention is made according to the throttling function technology. The _PPC control instruction is used to set the number of the related performance speed supported by the CPU. In other words, using the throttling function originally supported by the CPU, the operation system dynamically adjusts the related performance speed of the CPU in accordance with the requirements of the system. The degree of the adjusted related performance speed must be acceptable to the CPU. In other words, the adjusted related performance speed must be approved by the CPU. The operation system then selects the related performance speed of the CPU according to the required system power.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 shows a diagram comparing the power consumption of a CPU with a performance setting in accordance with the present invention and a CPU without the performance setting.

DETAILED DESCRIPTION OF THE PREFERRED EMBODIMENT

Figure 1:
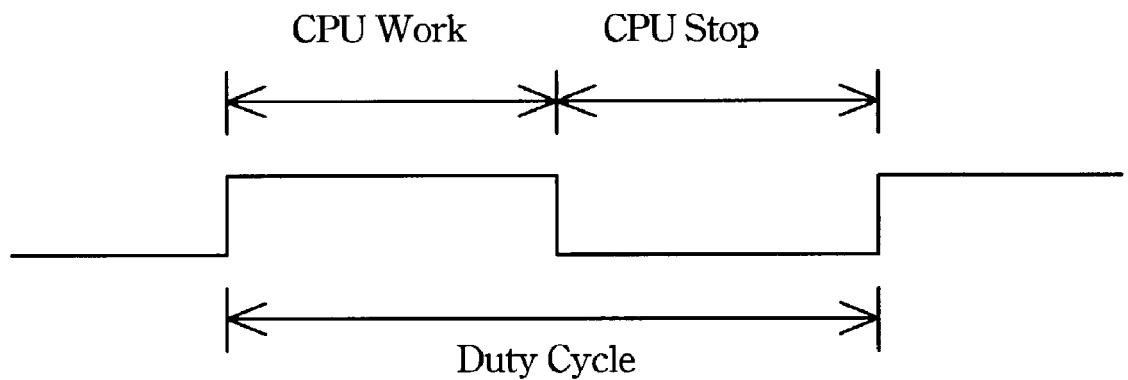
FIG. 1 shows a throttling function in a duty cycle.

Without limiting the spirit and scope of the present invention, the CPU performance control method proposed in the present invention is illustrated with one preferred embodiment. Skilled artisans, upon acknowledging the embodiments, can apply the performance control method of the present invention to any kind of desktop CPU.

In accordance with the performance control method of the present invention, the user may use the three control instructions, _PCT, _PSS and _PPC, provided by the Advanced Configuration and Power Interface (ACPI) to control the desktop CPU. The desktop CPU and the mobile CPU both support the throttling function technology. Therefore, the set of the _PCT and the _PSS control instructions provided by the ACPI in this present invention exists in accord with the throttling function technology. On the other hand, the _PPC control instruction is used to set the number of the related performance speed supported by the CPU. In other words, using the throttling function originally supported by the CPU, the operation system dynamically adjusts the related performance speed of the CPU in accordance with the requirements of the system.

A mobile PC is designed to be carried by a user. The main difference between a desktop PC and a mobile PC is that the mobile PC sometimes exclusively uses a battery as power source. Therefore, the power management function becomes the most important part of battery management technology in the mobile PC because the battery life determines duration of use. A current trend is use of a desktop CPU in a mobile PC to reduce the manufacture cost. However, the inherent high power consumption and the high thermal generation of the desktop CPU limit such application. The performance control method provided by the present invention uses the three control instructions, _PCT, _PSS and _PPC, provided by the ACPI is to resolve the above inherent problems.

Typically, power management is performed by the BIOS (Basic Input/output system). However, the BIOS is a firmware existing between the operation system and the hardware. Therefore, the power management function of BIOS is limited. The maximum limitation comes from the version of the BIOS. Different versions of BIOS have different management ranges in the power management and the program management employed by the user. However, when compared with the BIOS, the management range of the operation system is larger. For example, the CPU need not run at full speed when a user just uses a mobile PC for typing as a word processor and the operation system in this case should automatically slow down the CPU. However, the BIOS cannot implement this action of slow down.

An operation system may interact with a user. The operation system can automatically arrange for the CPU to stop these special interactive functions when the operation system becomes aware that the special functions provided by the CPU are not being used by the user. Such an arrangement method reduces the power consumption of the CPU. This kind of power management is called an Advanced Configuration and Power Interface, ACPI. The ACPI was co-developed by Intel, Microsoft and Toshiba. The ACPI is a common power management interface existing between the hardware and the operation system, which integrates the power management of the hardware. The operation system uses the ACPI to acquire the operation state of the computer system and find which function of the CPU is being used by the user and then to arrange the performance of the CPU. Such arrangement increases the efficiency of power consumption.

Typically, the three control instructions, _PCT, _PSS and _PPC provided by the ACPI 2.0 are not used in a desktop CPU. In other words, the operation system adjusts the CPU's related performance speed only when the temperature of the desktop CPU is too high. No other performance control method is provided for the desktop CPU except for the method of adjusting the related performance speed according to the temperature of the CPU. In accordance with the method of the present invention, three control instructions, _PCT, _PSS and _PPC, are provided by the ACPI. The present invention changes the setting of the three control instructions, after which the operation system dynamically adjusts the related performance speed in accordance with the state of the computer system and the power consumption efficiency is increased. An embodiment of the present invention will be described in the following. This embodiment provides a method for controlling the performance of the desktop CPU in accordance with the Advanced Configuration and Power Interface under the Win XP operation system.

The optional object of the _PCT control instruction declares an interface that allows an operation system to transition the CPU into a performance state. The operation system performs the CPU performance transitions by writing the performance state-specific control value to a Performance Control Register (PERF_CTRL).

The optional object of the _PSS control instruction indicates to the operation system the number of supported CPU performance states, related performance speeds, that any given system can support. This object evaluates in relation to a packaged list of information about available performance states including the following six register values.

The first register value is the "CoreFreq", internal CPU core frequency, which indicates the core CPU operating frequency (in MHz). The second register value is the "power", the power dissipation, which indicates the typical power dissipation (in milliWatts). The third register value is the "TransitionLatency", that indicates the worst-case latency in microseconds when the CPU is unavailable during a transition from any performance state to this performance state. The fourth register value is the "BusMasterLatency", that indicates the worst-case latency in microseconds when Bus Masters are prevented from accessing memory during a transition from any performance state to this performance state. The fifth register value is the "Control", needed to transition between performance states, and indicates the value to be written to the Performance Control Register (PERF_CTRL) in order to initiate a transition to the performance state. The sixth control register is called the "Status", which allows the operation system to verify performance transition status after any initiated transition change request and indicates the value that operation system will compare to a value read from the Performance Status Register (PERF_STATUS) to ensure that the transition to the performance state was successful.

The optional object of the _PPC control instruction is a method that dynamically indicates to the operation system the number of performance states currently supported by the platform. This method returns a number that indicates the _PSS entry number of the highest performance state that the operation system can use at a given time. The operation system may choose the corresponding state entry in the _PSS as indicated by the value returned by the _PPC method or any lower power (higher numbered) state entry in the _PSS. The operation system will check this value read from the Performance Status Register (PERF_STATUS) of the _PSS control instruction to ensure that the transition to the performance state was successful.

The present invention dynamically adjusts the related performance speed in accordance with the state of the computer system by changing the setting of the three control instructions, _PCT, _PSS and _PPC provided by the ACPI, and using the throttling function supported by the desktop CPU. This throttling function as described in the FIG. 1 permits the operation system to determine the related performance speed of the CPU in accordance with the state of the system in the whole cycle.

First, the setting of the _PCT control instruction is changed. Typically, in accordance with the throttling function of the CPU, the operation system instructs the CPU to slow down through a chipset when the temperature of the CPU is too high. The present invention therefore sets the _PCT control instruction to the throttling setting port of the chipset. The register value in the Performance Control Register of the _PCT control instruction and the Performance Status Register are the same because the control port and the status port of the throttling function are the same, and the register value is related to the chipset used.

Next, the setting of the _PSS control instruction is changed. This optional object of the _PSS control instruction indicates to the operation system the number of supported CPU performance states that any given system can support. Six register values are used to represent each performance state. These register values of the "CoreFreq", indicating the internal CPU core frequency, and the "power", indicating the power dissipation of the CPU, are related to the CPU used. Therefore, the two register values are written in accordance with the CPU used.

The register value "TransitionLatency" indicates the worst-case latency in microseconds when the CPU is unavailable during a transition from any performance state to this performance state. This unavailable time is related to the transition time needed by the CPU and the peripheral device. Therefore, the register value may be set in accordance with the CPU used and the peripheral device.

The register value "BusMasterLatency" indicates the worst-case latency where Bus Masters are prevented from accessing memory during a transition from any performance state to this performance state. The bus need not be changed when transforming the performance state. Therefore, this register value is set to zero.

The register value "Control" and the register value "Status" are set to the same value because the register values of the status and the control existing in the throttling function are the same. Therefore, the register value written to the Performance Control Register of the _PCT control instruction and the Performance Status Register is also the same and the register value is related to the chipset used.

Finally, the setting of the _PPC control instruction is changed. This optional object of the _PPC control instruction is a method that dynamically indicates to the operation system the number of performance states currently supported by the platform. This is related to the number of the performance states supported by the CPU. For example, a CPU provides five related performance speeds (performance states), P4 2.2 GHz. The related performance speed is the work percentage in a duty cycle of the CPU. The five related performance speeds respectively are 100%, 87.5%, 75%, 62.5% and 50%. Therefore, the CPU work frequencies of the five related performance speeds respectively correspond to the 2.2 GHz, 1.88 GHz, 1.65 GHz, 1.37 GHz and 1.1 GHz. In accordance with the preferred embodiment, a desktop CPU is installed in a mobile PC. Therefore, the _PPC control instruction is set to instruct the operation system to control the CPU to work at the work frequency of 2.2 GHz if the mobile PC is connected to the AC outlet. On the other hand, the operation system instructs the CPU to work at the lower work frequency, such as 1.88 GHz, 1.65 GHz, 1.37 GHz and 1.1 GHz, if the mobile PC is powered by the battery. In other words, the operation system determines the work frequency operated by the CPU in accordance with the state of the mobile PC system.

Figure 2:
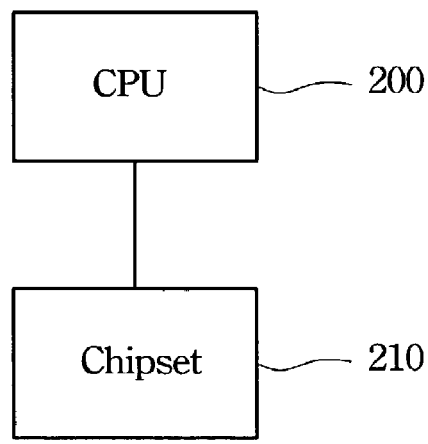
FIG. 2 shows a schematic diagram of the chipset controlling the CPU in a computer system.

Referring to FIG. 2, the CPU 200 is connected to a chipset 210. The chipset 210 is responsible for communication between those functions, including the work frequency, the input/output control of the memory, the input/output control of the bus, the process of interrupt request (IRQ), the direct memory access (DMA) and so on. The chipset 210 includes two parts, a north bridge chipset and a south bridge chipset. The north bridge chipset is also called a "system control chip" for controlling these devices with high speed. The south bridge chipset is also called a "peripheral control chip" for controlling these devices with low or middle speed. When the setting is finished, once the operation system detects that the mobile PC is powered by the battery, the operation system instructs the chipset 210 according to the ACPI to control the CPU 200 and adjust its related performance speed to reduce power consumption.

FIG. 3 compares the power consumption of a CPU with a performance setting in accordance with the present invention and a CPU without the performance setting. Although the power consumption is almost the same for the life test, there is an obvious difference under the conditioning test. In other words, under the conditioning test, the battery life is increased by 25% for the CPU with the performance setting.

Therefore, in accordance with the present invention, a desktop CPU can be installed in a mobile PC to reduce the manufacture cost, and can also be installed in a desktop PC to reduce power consumption, thus achieving a green computer. The present invention can be used with the Win XP operation system as well as with any operation system providing the ACPI. Power management efficiency is raised by the present invention.

As is understood by a person skilled in the art, the foregoing preferred embodiments of the present invention are illustrative of the present invention rather than limiting of the present invention. They are intended to cover various modifications and similar arrangements included within the spirit and scope of the appended claims. The scope of which should be accorded the broadest interpretation so as to encompass all such modifications and similar structure.

What is claimed is:

1. A performance control method for a computer with a desktop CPU, wherein said desktop CPU having a specified number of supported performance states is connected to a chipset, said desktop CPU and said chipset both support a throttling function technology, said method comprising:
   setting _PCT control instruction, _PSS control instruction and _PPC control instruction provided by the Advanced Configuration and Power Interface (ACPI) in accord with said throttling function technology and the specified number of supported performance states, wherein setting _PCT control instruction includes setting said _PCT control instruction to a setting port of the throttling function in said chipset; and
   setting a Performance Control Register and a Performance Status Register of said _PCT control instruction to a same register value.

2. The performance control method for a computer according to claim 1, wherein said register value set in said Performance Control Register and said Performance Status Register is related to said chipset.

3. The performance control method for a computer according to claim 1, wherein said setting _PSS control instruction provided by the ACPI in accordance with said throttling function technology further comprises setting register values existing in the _PSS control instruction as follows: "CoreFreq", "power dissipation", "BusMasterLatency", "TransitionLatency", "control" and "status".

4. The performance control method for a computer according to claim 3, wherein said register values of said "control" and said "status" are set to a same value.

5. The performance control method for a computer according to claim 3, wherein said register values of said "BusMasterLatency" are set to zero.

6. The performance control method for a computer according to claim 3, wherein said register value of said "TransitionLatency" is related to the hardware of the computer.

7. The performance control method for a computer according to claim 3, wherein said performance state is a percentage of said desktop CPU working in a duty cycle.

8. A performance control method using an ACPI applied to a computer with a desktop CPU, wherein said desktop CPU having a specified number of supported performance states is connected to a chipset, said desktop CPU and said chipset both support a throttling function technology, said ACPI comprises three control instructions _PCT control instruction, _PSS control instruction and _PPC control instruction, said method comprising:
   setting said _PCT control instruction to a setting port of throttling function in said chipset;
   setting the register values of the Performance Control Register and the Performance Status Register of said _PCT control instruction to a same register value;
   setting register values existing in the _PSS control instruction of "CoreFreq", "power dissipation", "BusMasterLatency", "TransitionLatency", "control" and "status", wherein said register values of said "control" and said "status" are set to a same value and said register values of said "BusMasterLatency" are set to zero; and
   setting said _PPC control instruction in accordance with the specified number of supported performance states by said desktop CPU.

9. The performance control method using an ACPI applied to a computer with a desktop CPU according to claim 8, wherein said register value set in said Performance Control Register and the Performance Status Register is related to said chipset.

10. The performance control method using an ACPI applied to a computer with a desktop CPU according to claim 8, wherein said register values set in said "control" and said "status" are related to said chipset.

11. The performance control method using an ACPI applied to a computer with a desktop CPU according to claim 8, wherein said register value of said "TransitionLatency" is related to the hardware of the computer.

12. The performance control method using an ACPI applied to a computer with a desktop CPU according to claim 8, wherein said performance state is a percentage of said desktop CPU working in a duty cycle.

13. A performance control method applied to a computer with a desktop CPU under Win XP environment, wherein said Win XP supports an ACPI comprising three control instructions, _PCT control instruction _PSS control instruction and _PPC control instruction, said desktop CPU having a specified number of supported performance states is connected to a chipset, said desktop CPU and said chipset both support the throttling function technology and said ACPI, said method comprising:
   setting said _PCT control instruction to a setting port of the throttling function in said chipset;
   setting register values of the Performance Control Register and the Performance Status Register of said _PCT control instruction to a same register value;
   setting register values existing in the _PSS control instruction of "CoreFreq", "power dissipation", "BusMasterLatency", "TransitionLatency", "control" and "status", wherein said register values of said "control" and said "status" are set to a same value and said register values of said "BusMasterLatency" is set to zero; and
   setting said _PPC control instruction in accordance with the specified number of supported performance states by said desktop CPU.

14. The performance control method applied to a computer with a desktop CPU under Win XP environment according to claim 13, wherein said register value set in said Performance Control Register and the Performance Status Register is related to said chipset.

15. The performance control method applied to a computer with a desktop CPU under Win XP environment according to claim 13, wherein said register values set in said "control" and said "status" are related to said chipset.

16. The performance control method applied to a computer with a desktop CPU under Win XP environment according to claim 13, wherein said register value of said "TransitionLatency" is related to the hardware of the computer.

17. The performance control method applied to a computer with a desktop CPU under Win XP environment according to claim 13, wherein said performance state is a percentage of said desktop CPU working in a duty cycle.

* * * * *